United States Patent [19]

Sherer

[11] Patent Number: 4,692,680
[45] Date of Patent: Sep. 8, 1987

[54] PORTABLE BATTERY CHARGING APPARATUS AND METHODS THEREFOR

[75] Inventor: Paul Sherer, Costa Mesa, Calif.

[73] Assignee: Seacliff International, Inc., South El Monte, Calif.

[21] Appl. No.: 764,656

[22] Filed: Aug. 12, 1985

[51] Int. Cl.$^4$ .............................................. H02J 7/04
[52] U.S. Cl. .......................................... 320/2; 320/3; 320/44; 320/48; 340/636
[58] Field of Search ....................... 320/2–5, 320/15, 16, 35, 39, 40, 44, 48, 37, 38; 340/636

[56] References Cited

U.S. PATENT DOCUMENTS

| | | | |
|---|---|---|---|
| 3,484,681 | 12/1969 | Grady, Jr. et al. | 320/44 X |
| 3,594,627 | 7/1971 | Lesher | 320/21 |
| 3,617,850 | 11/1971 | Domshy | 320/44 X |
| 3,895,284 | 7/1975 | Schweizer et al. | 320/44 X |
| 4,004,208 | 1/1977 | Tamminen | 320/16 X |
| 4,194,146 | 3/1980 | Patry | 320/44 |
| 4,307,330 | 12/1981 | Belot | 320/48 X |
| 4,387,334 | 6/1983 | Loper | 320/44 |
| 4,396,881 | 8/1983 | Cook et al. | 340/636 X |
| 4,455,523 | 6/1984 | Koenck | 320/35 X |

Primary Examiner—R. J. Hickey
Attorney, Agent, or Firm—Edward J. DaRin

[57] ABSTRACT

Portable apparatus for charging a lead-acid battery from a direct current source such as a series of dry cells that can be conveniently carried in a motor vehicle or the like. An electronic circuit measures the actual current transferred to a battery undergoing charging and automatically signals when a preselected quantity of electric charge has been transferred to the battery undergoing charging. The electronic circuit means also signals that the battery undergoing charging has a preselected voltage level. The electronic circuit automatically signals that the direct current source has sufficient energy to charge a battery before a battery to be charged is connected thereto. The timing of the charge transfer is through the provision of charging and discharging a capacitor between preselected voltage levels by a current proportioned relative to the charging current and counting up a binary counter each time a preselected point in the oscillations are reached until a preselected count is reached.

20 Claims, 5 Drawing Figures

PORTABLE BATTERY CHARGING APPARATUS AND METHODS THEREFOR

FIELD OF INVENTION

This invention relates to portable battery charging apparatus and methods for charging discharged lead-acid batteries.

BACKGROUND OF INVENTION

A common problem with the use of lead-acid batteries is that when the battery becomes discharged, it renders the equipment for which it is to be powered inoperative due to the lack of an adequate power source. This common problem is most evident in the use of batteries in motor vehicles since if the battery becomes discharged with time, in a discharged state it does not provide sufficient electrical energy to allow the motor vehicle to be started or the lights to be energized or the horn to be sounded. Of course, once the engine is started, the engine operates an electrical generator that is effective to charge the battery and continues to charge the battery while driving. When a motor vehicle battery is discharged to such an energy level that the motor vehicle engine cannot be started, it is common to attempt to start the engine by the use of jumper cables for connecting the discharged battery to a charged battery located in a second vehicle. This, of course, requires the second vehicle to be produced at the location of the vehicle having the discharged battery for starting the stranded motor vehicle. Commercial battery chargers such as stored in service stations are usually powered from an alternating current source and therefore require an electrical outlet.

Portable battery chargers of the type that may be readily stored in a motor vehicle so as to be transported with the motor vehicle are presently commercially available. These portable battery chargers are configured to occupy a minimum of space in the motor vehicle or in the storage compartment therefor, such as the trunk. These portable battery chargers are usually utilized to transfer sufficient charge to a discharged battery to allow a motor vehicle to be started. The presently available known portable battery chargers are powered by a number of dry cells. The advantage of the availability of the portable battery charger is that they allow the battery to be charged at the point the discharged battery is noticed without the need for a second vehicle, the use of jumper cables and/or electrical outlets.

The commercially available portable battery chargers have been found to be deficient in their implementation. These portable battery chargers depend on a direct current power pack for their power source to charge a battery. The battery pack at the time that it is required to charge a battery must have sufficient voltage and current to transfer the necessary amount of electrical current to a discharged battery in order to properly charge the battery. One such prior art unit incorporates a nickel-cadmium dry cell as the direct current power pack. A nickel-cadmium battery will transfer a high charge in a short time. However, it has been found that a major disadvantage of using such batteries is the inability of the batteries to hold a charge and therefore the user will need to constantly check to see if his portable charging apparatus is charged sufficiently for later use. Such a unit also does not incorporate any reliable method of monitoring charge transfer to the discharged battery, and the operation of the portable battery charger depends solely upon an analysis of the battery condition by the user, which can be faulty at best. Other prior art portable battery charging units have incorporated too few dry cells in their power pack to provide the desired voltage and current and at best are marginally useful for their intended purpose. These prior art units also sense the battery voltage as an indication of the charge transferred to the battery, and this technique is unreliable for such portable battery charging apparatus. Accordingly, there is a present need for an improved, more reliable, portable battery charger that can be readily stowed in a motor vehicle or on a boat that is capable of transferring sufficient energy to the battery to allow operation of a motor vehicle or to initiate the operation of the motor-generator set on a boat or the like.

SUMMARY OF INVENTION

The present invention provides an improved, more reliable, self-contained, portable battery charging apparatus that provides sufficient energy to a discharged battery to permit the charged battery to start an automobile engine, electrical generator on a boat, or the like. The portable battery charger is powered from a reliable direct current power pack of alkaline batteries for providing the appropriate voltage and current when needed to assure the user that the maximum charge can be transferred to a discharged battery. The battery pack is further constructed and defined so as to be capable of use of up to 12 charge cycles, without requiring a replacement of the dry cell batteries. The apparatus is constructed and packaged so they may be readily slipped under a car seat, into the trunk of a motor vehicle or the like so as to occupy a minimum amount of space in the motor vehicle or wherever stored. The charging of the battery in accordance with the present invention is continuously measured by the provision of a reliable, solid state circuit in the form of a semiconductor chip functioning as a coulometer and automatically signaling when a preselected quantity of charge has been transferred to the discharged battery. The improved electronic circuit measures the actual current transferred (not dependent on voltage sensing) to the battery and indicates when a sufficient amount of current has been transferred. All operations of the portable battery charger, in accordance with the present invention, are automatic, and no operator intervention is required. The portable battery charger automatically signals if the DC power pack has sufficient energy for charging a battery, as well as automatically signaling during battery charging that a charge is, in fact, being transferred to the battery and automatically signals the completion of a battery charging cycle.

From a method standpoint, the method for charging a lead-acid battery from a direct current power source consisting of dry cell batteries comprehended by the present invention includes the steps of arranging 16 alkaline batteries in a series circuit relationship as a direct current power pack for providing an output voltage of approximately 24 volts, and directly connecting a discharged lead-acid battery, capable of being charged, to the direct current power pack for continuously transferring an electric current to the battery for recharging the battery over a preselected time interval, the preselected time interval being selected for transferring a preselected quantity of electricity to the battery and then automatically measuring the actual current transferred to the battery over the preselected time interval and automatically signaling when the preselected quantity of electricity has been transferred to the battery.

From a structural standpoint, the portable apparatus of the present invention for charging a lead-acid battery comprises means for providing a preselected direct current voltage and current for charging a discharged lead-acid battery, the means including a plurality of dry cell batteries connected in a series circuit relationship. The apparatus also includes means for connecting a lead-acid battery to be charged in a series circuit relationship with a direct current means for transferring a preselected quantity of electrical charge to the lead-acid battery. Electronic circuit means is coupled across the direct current means in a parallel circuit relationship with the lead-acid battery, the electronic circuit means including means for providing an electrical current signal representative of the actual current transferred to a battery undergoing charge. The electronic circuit includes means for converting the electrical current signal to a voltage control signal. A voltage controlled oscillator means is coupled to be responsive to the voltage control signal for controlling the frequency of the oscillation cycles thereof. Means are provided in the electronic circuit for accumulating the oscillator cycles in an electronic counter until a preselected count is reached, the preselected count being representative of the transfer of a preselected quantity of electric charge to the lead-acid battery and thereby a charged condition. The apparatus may include voltage regulating means coupled across the direct current means for regulating the direct current voltage coupled to the electronic circuit means and thereby protecting same.

BRIEF DESCRIPTION OF THE DRAWINGS

These and other features of the present invention may be more fully appreciated when considered in the light of the following specification and drawings, in which.

DETAILED DESCRIPTION OF THE PREFERRED EMBODIMENT

Figure 1:
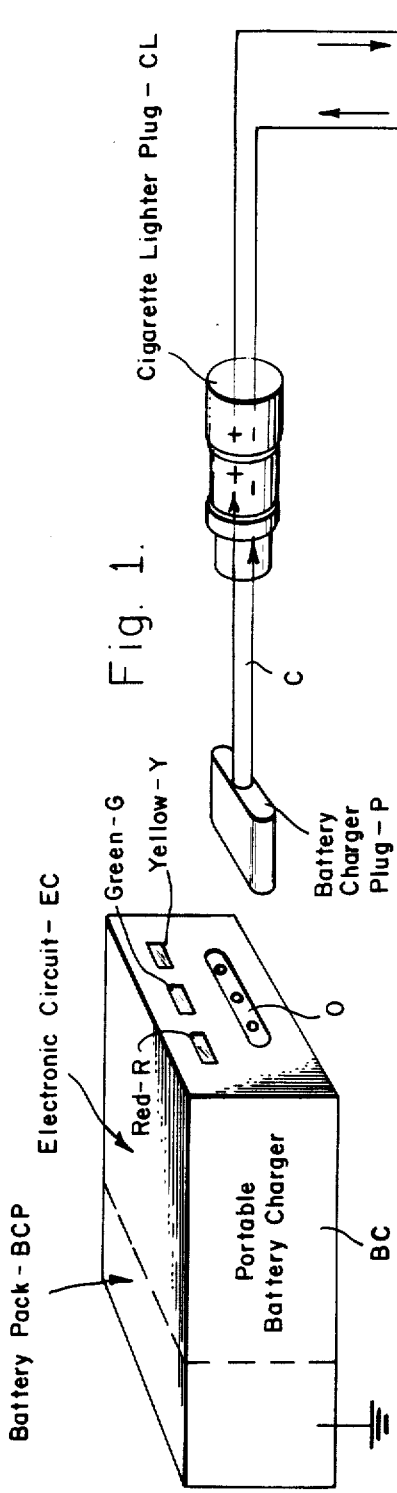
FIG. 1 is a block diagram of the portable battery charger embodying the present invention and diagramatically illustrating the manner in which a motor vehicle battery may be connected to the portable battery charger through the conventional cigarette lighter receptacle of a motor vehicle.

Now referring to the drawings, the detailed description of the portable battery charging apparatus BC will be described as it may be implemented for charging a motor vehicle battery by connecting a cable C having connector plugs for plugging into the battery charger BC and a conventional cigarette lighter receptacle located on the dashboard of a motor vehicle and thereby the motor vehicle battery B. It will be appreciated that when a discharged battery is not located on a motor vehicle so that a cigarette lighter receptacle is not available that the one end of the cable C can be connected to an adaptor for the cigarette lighter plug CL and which adaptor may have individual cables provided with clamps for clamping to the individual posts of a discharged battery. This latter application is for use with a battery on a boat, for example. The battery charging pack BCP is maintained within the housing for the battery charger BC, and the only operation required by the user of the apparatus for charging the battery B is to plug the battery charger plug P into the outlet O on the apparatus BC and insert the opposite end of the cable C or the one carrying the cigarette lighter plug CL into the cigarette lighter receptacle of the motor vehicle. The outlet O has three contacts. The only other apparatus on the outside of the housing for the battery charger BC are the lights for signaling the various conditions of the battery charger. The lights are illustrated in FIG. 1 as a red light, a green light and a yellow light arranged adjacent the outlet O. The battery pack BCP housed within the charger BC comprises a multiplicity of dry cell batteries connected in a series circuit relationship to provide the necessary charging voltage and current from the series connected batteries. The dry cells selected for the present invention are alkaline batteries or "D" cells (commonly referred to as flashlight batteries) that each have a terminal voltage of 1½ volts.

One of the important practical features of the present invention is the definition of the DC battery pack BCP for the reliable operation of the battery charger BC. Not only is the type of dry cell battery selected an important consideration, but also the number of dry cells utilized in series circuit relationship to assure the maximum charge transfer to the discharged battery B. It has been found that prior art portable battery apparatus employ 12 alkaline batteries. It has been found that by merely using 4 additional batteries, or 16 alkaline batteries, three times as much current is obtained from the power pack as when 12 batteries are utilized, and this use of the 16 batteries assures the maximum charge transfer to the discharged battery B. The 16 batteries, when connected in a series circuit relationship, provide a terminal voltage of 24 volts. For the purposes of the present disclosure, the 16 alkaline batteries will be considered as comprising the battery pack BCP. The charge provided by such a battery pack BCP is selected so that it is sufficient to get a motor vehicle engine started. It should also be recognized that battery B must be capable of taking a charge and that a completely discharged battery or one with a dead cell cannot be charged with the apparatus BC of the present invention. The battery charging apparatus BC is useful to charge either a 6-volt or a 12-volt battery.

Figure 2:
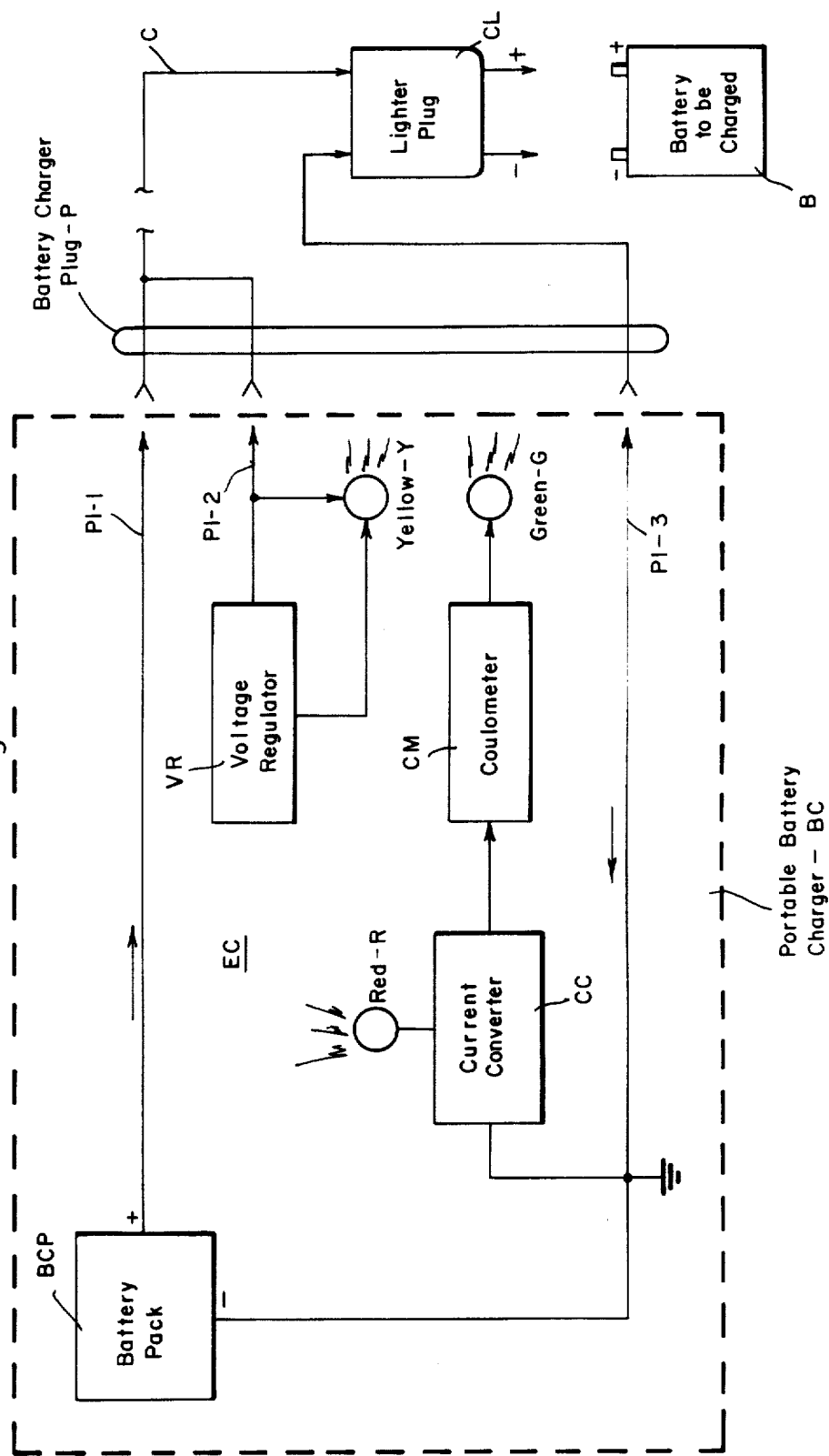
FIG. 2 is a block diagram of the electronic circuit of the portable battery charger of FIG. 1, illustrating the manner in which a battery to be charged can be coupled to the cigarette lighter receptacle of a motor vehicle.

With the aforementioned concepts in mind, the generalized block diagram of the portable battery charger BC will now be examined in conjunction with FIG. 2. The battery pack BCP is connected to the discharged battery B by the cable C, as described in conjunction with FIG. 1 hereinabove. The charging current supplied by the battery pack BCP to the battery B is supplied in the reverse direction from which current normally flows from the battery. As indicated in FIG. 2, the positive terminal of the battery pack BCP is connected through the cable C, the battery charger plug P and the lighter plug CL is connected to the positive terminal of the battery B undergoing charging. Similarly, the negative terminal of the battery pack PCB is connected to the negative terminal of the battery B such as through a ground connection. The charging current, then, that flows from the battery pack BCP to the battery B forms a loop between the battery pack BCP and the battery B. Arranged in parallel circuit relationship with this loop is an electronic circuit EC for measuring the amount of charge or current transferred to the battery B from the battery pack BCP. The battery pack BCP is arranged to also power the electronic circuit EC. The contact to the positive terminal of the battery pack BCP is identified in FIG. 2 as the contact P1-1 while the contact to the negative terminal is connected to ground by means of the contact P1-3. The contact for powering the electronic circuit EC from the battery pack BCP is the contact P1-2. Each of the contacts P1-1, P1-2 and P1-3 is located at the outlet O for the apparatus BC. When the battery charger plug P is connected into the outlet O for the battery charger BC and the cigarette lighter plug CL secured into the cigarette lighter receptacle, current will flow through contacts P1-1 into the battery B and from the negative terminal of the battery through contact P1-3 to ground or to the negative terminal of the pack BCP. The connection to the electronic circuit EC is through the contact P1-2. Assuming that the cigarette lighter plug CL is not placed within the cigarette lighter receptacle but the cable C has its plug P connected to the outlet O and thereby the contacts P1-1 and P1-2, this will apply the battery pack voltage to the electronic circuit EC. The electronic circuit EC includes a current converter CC for sensing the current flowing in the current loop between the battery pack BCP and the battery B. The current converter CC is provided with a signaling device in the form of a light R that, when energized, produces a red light signal. The current converter CC is coupled to a coulometer CM which measures the charge transfer to the battery B. The coulometer CM is also provided with a signaling device in the form of a green light G. The remaining portion of the electronic circuit EC is a voltage regulator VR which is connected between the terminal P1-2 and ground potential. The voltage regulator VR is also provided with a signaling device in the form of a light emitting device Y, emitting a yellow light. The light is connected between contact P1-2 and regulator VR.

One of the important considerations that should be evident in the charging of the battery B is that the battery pack BCP must have sufficient voltage at the time that it is to be used to charge the battery. For this purpose then, when the cable C is plugged into the contacts P1 and P2 at the outlet O without having its opposite end connected to the battery B, the voltage output of the battery pack BCP will be sensed at the voltage regulator VR. If there is sufficient charge in the battery pack BCP to charge the battery B, the yellow signaling light Y will be illuminated so that the user of the charger BC is made aware of this status of the battery pack BCP. When the cable C is then plugged in to the cigarette lighter receptacle, the battery pack BCP will be coupled to the battery B to be charged. If the red light R associated with the current converter CC becomes illuminated at this time, it will tell the user of the charger BC that a charge is being transferred to the battery B from the battery pack BCP. When the battery B is charged to a preselected level that is measured by the coulometer CM, it will signal that it has reached a state at which it can be considered as charged, and it will cause the green light signal G to be illuminated for signaling the user. During the charging of the battery B, the yellow signaling light should also be illuminated. If this is not illuminated, then it will signal the user that the battery B is not sufficiently charged for the battery to start the motor vehicle engine. In accordance with the present invention, a single charge transfer of $\frac{1}{4}$ ampere-hour is considered as charging the battery B sufficiently to allow the engine to be turned over. At the first time that the battery pack BCP is used for charging the battery B, the charge time has been found to be on the order of 13 minutes. After the battery charger BC has been used 11 times, and at the 12th use, the charging time is approximately 30 minutes. If a battery B is severely discharged, i.e., no headlights are energized, the battery may not be sufficiently charged for an engine start by a $\frac{1}{4}$ ampere-hour charge transfer. If this occurs, the user can then unplug the cable C from the electronic circuit EC after the time the green light G is illuminated indicating a first charge cycle has been completed and then replug it to obtain another $\frac{1}{4}$ ampere-hour charge or a 1 ampere-hour charge. The range of currents that are provided from the battery pack BCP is from $\frac{1}{2}$ ampere to 4 amperes. If the charger BC is used relatively frequently, within the shelf life of the battery pack BCP, at least 12 charge cycles may be withdrawn from the battery pack. Each successive use of the battery pack BCP will require a longer period of time to achieve the $\frac{1}{4}$ ampere-hour charge transfer. When the battery B is connected to the charger BC, the yellow signaling light Y will not be energized unless the voltage regulator VR senses that the battery B is above about 12.3 volts. A battery B with a dead cell will not reach this voltage level, and the dark light Y will signal the user that the battery B is defective for charging purposes.

Now referring to FIG. 3, the detailed circuit implementation of the electronic circuit EC will be described. As noted hereinabove, the current flowing between the battery pack BCP and the battery B forms a loop so that the return path from the battery is by means of the contact P1-3 and the lead wire leading to the negative terminal of the battery pack BCP. The current converter CC is coupled to this current loop and a sensing of the current in this loop is provided through the use of a resistor R16 in series circuit relationship between the contact P1-3 and the negative terminal of the battery pack BCP. The voltage across the resistor R16 is proportional to the actual loop current flowing through the battery B. This voltage is converted into a current that is a fractional portion of the actual charging current. This is performed by a transistor Q5 and a resistor R11 and an operational amplifier 20. The resistor R11 has one terminal connected to ground in common with the resistor R16 and the other terminal connected to the emitter electrode of the transistor Q5. The base electrode of the transistor Q5 is connected to the output terminal of the operational amplifier 20. The resistive values of the resistors R11 and R16 are proportioned so that the voltage drop across these resistors is the same. Resistor R16 has a relatively low resistance value, while the resistor R11 has a relatively high resistance value so that with the difference in the resistance values, the currents flowing through the resistor R16 and R11 will be proportioned accordingly. The current flowing through resistor R11 is 1/62,000 of the battery charging current in resistor R16. The common junction between the resistor R11 and the emitter of transistor Q5 is connected to the negative input terminal for the operational amplifier 20. The positive input terminal for the operational amplifier 20 is connected to the positive side of the resistor R16. The arrangement of the operational amplifier 20 is such that the output of the amplifier controls the current flow through the transistor Q5 so that the voltage across the resistors R11 and R16 is always maintained at the same voltage level. This relationship causes the current in the collector electrode of the transistor Q5 to be 1/62,000 of the current flowing through the battery B. The collector electrode of transistor Q5 is connected to a current mirror circuit formed by the combination of the resistor R1 and the transistor Q1, and the resistor R2 and the transistor Q2. In this current mirror circuit the terminals of the resistors R1 and R2 are both connected to the voltage source $V_{cc}$. The collector electrode for the transistor Q1 is connected directly to the collector electrode for the transistor Q5. The collector electrode for the transistor Q1 is also connected directly to the base electrode for the transistor Q1, along with the base electrodes for the transistors Q1 and Q2 being connected in common. The remaining terminal of the resistor R1 is connected to the emitter electrode for the transistor Q1, while the remaining terminal for the resistor R2 is connected to the emitter electrode for the transistor Q2. This current mirror portion of the current converter reflects the current proportional to the battery current into a storage capacitor C1 which forms a portion of the coulometer CM, as a result of the collector electrode of transistor Q2 being connected thereto.

A second operational amplifier 21 functions to control the energization of the light emitting diode DS1 that emits a red light when energized and initiates the operation of the coulometer CM. The positive terminal of the amplifier 21 is connected to the positive side of the resistor R16 in common with the positive input terminal for the amplifier 20. The negative input terminal for the amplifier 21 is connected to ground potential through the resistor R14. A feedback circuit including the light emitting diode DS1 and the series rectifiers CR4 and CR5 is connected between the output terminal of the operational amplifier 21 and the negative input terminal. The current flowing through DS1 is arranged to be a proportional amount of the actual battery current. The operational amplifier 21 also functions to provide a signal for resetting the coulometer CM in preparation for initiating the timing cycle of the coulometer. The positive input terminal of the operational amplifier 21 senses the battery B current flowing through the resistor R16 when the current first flows therethrough and causes the output voltage from the amplifier to go positive which is coupled to the coulometer CM through the capacitor C3. The feedback loop through the diodes CR4, CR5 and DS1 will later function to drive the voltage drop across the resistor R14 connected to the negative input terminal of the operational amplifier to be the same as the voltage drop across the sensing resistor R16. The output signal from the operational amplifier 21 is also effective with the comparator 22 to provide a triggering signal to the coulometer CM to initiate the charge timing cycle. The comparator 22 has its negative input terminal connected to a bias source BS and its positive input terminal to the output terminal of the operational amplifier 21 through the blocking diode CR6. The output signal from the operational amplifier 21 is coupled through a RC time delay network into the positive terminal of the comparator 22. The RC time delay network comprises the resistor R15 connected to the output terminal of operational amplifier 21 and the capacitor C2 connected in seried circuit relationship with the resistor R15 and ground. The positive terminal of the compartor 22 is connected to the common junction between the resistor R15 and capacitor C2. The delay produced by this RC circuit will trigger the comparator 22 to cause it to produce a high output voltage level for triggering the coulometer CM for initiating the timing of the charger transfer.

It should be noted that the implementation of the operational amplifiers 20 and 21 and the comparators 22 and 23 is in terms of a commercially available microchip. For this purpose each of the four mentioned elements are further identified in FIG. 3 as the chip U1 and the pins individual to the circuit. In its commercially available form the element U1 comprises four operational amplifiers packaged within a 14 pin DIP package and commercially identified as LM324. To this end, the operational amplifier 20 is defined by the positive input pin 5 and the negative input pin 6, along with the output pin 7 for one of the operational amplifiers on the chip. The operational amplifier 21 is defined by the input pins 2 and 3 and the output pin 1 for a second one of the four operational amplifiers. The pin 3 is the positive input terminal of the operational amplifier 21. In view of the low cost of the microchip U1, the comparators 22 and 23 are defined by the remaining two operational amplifiers on the chip U1 but adapted to function as comparators in lieu of operational amplifiers. The comparator 22 utilizes pins 12 and 13 as the input terminals and pin 14 as the output terminal. The positive terminal is pin 12. The comparator 23 utilizes pins 9 and 10 as input terminals and pin 8 as the output terminal. Pin 10 is the positive input terminal. Pin 14 is utilized to connect to the voltage source $V_{cc}$, as illustrated.

Figure 5:
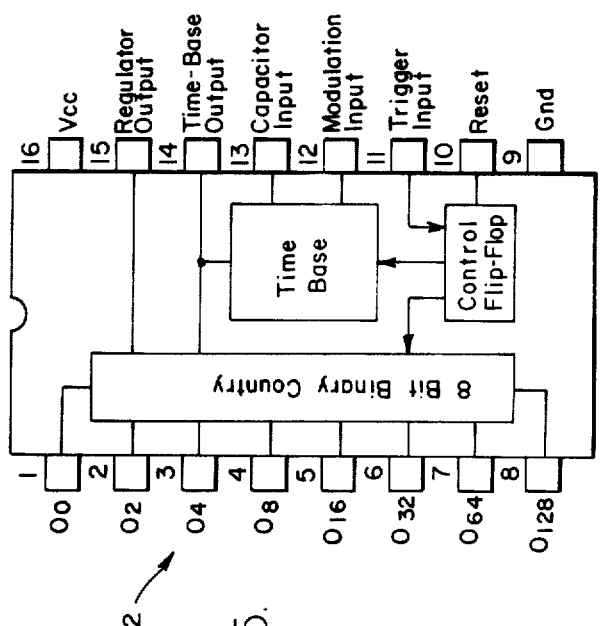
FIG. 5 is a top view of a connection diagram of the 16-pin DIP packaging the programmable timer/counter of FIGS. 3 and 4.
Figure 3:
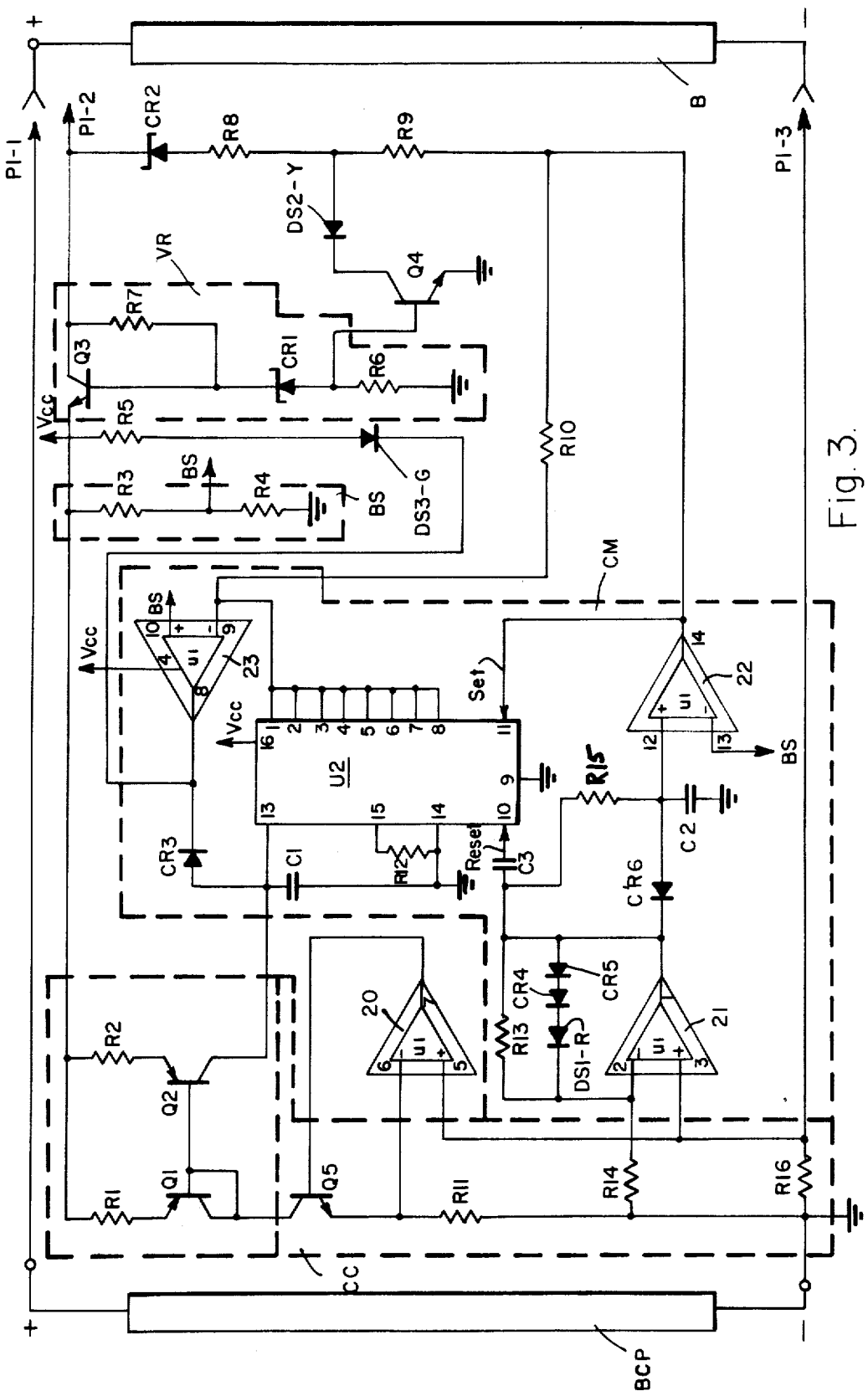
FIG. 3 is a schematic circuit diagram of the electronic circuit for the portable battery charger embodying the present invention.

The basic element of the coulometer CM for measuring the charge transferred to the battery B is a programmable timer/counter of commercially available construction and, as illustrated in FIG. 3, is identified as U2. The programmable timer/counter U2 in its commercially available form is a microcircuit chip that is available from the Fairchild Division of Schlumberger and is commercially identified by Fairchild as a $\mu$A2240 programmable timer/counter. The connection diagram for the 16 pin DIP package is illustrated in FIG. 5. The element U2 comprises a time base oscillator, programmable 8-bit binary counter and a control flip-flop. The binary counter outputs are obtained from the pins 1 through 8 and are identified in FIG. 5 as the outputs $O_0$, $O_2$, $O_8$, ... $O_{128}$. The time base pins are identified as the pins 13, 14 and 15. The trigger input for the chip is the pin 11, while a reset signal is connected to pin 10 with the pin 9 being connected to ground potential. Pin 16 represents the $V_{cc}$ terminal.

In the conventional operation of the programmable timer/counter element U2, when electrical power is applied thereto and no input signals are present at the reset input pin 10 and the trigger input pin 11, the circuit operation commences with all output signals at a high voltage level. The application of a positive-going pulse to the trigger input pin 11 will initiate the timing cycle. The trigger pulse will initiate the timing cycle within the element U2. The trigger pulse activates the timebase oscillator circuit, enables the binary counter and sets all the counter output pins to a low voltage level. Once triggered, the element U2 is immune from additional trigger inputs until the timing cycle is completed or a reset input pulse is applied to pin 10. If a reset input pulse and a trigger input pulse are concurrently applied to pins 10 and 11, the trigger pulse takes precedence. When the element U2 is in a reset state, both the oscillator and the counter output pins are at a high voltage level. The element U2 starts timing when a trigger pulse is applied and automatically resets itself to complete the timing cycle when the programmed count is completed; for the purposes of the present invention, the programmed count is the full count of the binary counter or 255. In accordance with the present invention, the timing of the charge transfer to the battery B results from the oscillations produced by the charging and discharging of the capacitor C1 between preselected high and low voltage levels and counting up the binary counter of the element U2, as will be explained more fully hereinafter.

As illustrated in FIG. 3, pin 13 is connected to the positive terminal of the storage capacitor C1 with the opposite terminal being connected to ground. A pull up resistor R12 is connected between terminals 14 and 15. The output pins for the binary counter of element U2 are the pins 1 through 8 and are all connected in common to provide an input signal at the negative input terminal for the comparator 23 or the 9 pin for the element U1. The positive input terminal for the comparator 23 is the pin 10 for the element U1 and which is shown connected to the bias source BS. The comparator 23 is also connected to the $V_{cc}$ source. The output terminal of the comparator 23 (pin 8 of element U1) is connected to the collector electrode of transistor Q2 through the diode CR3 in common with the capacitor C1. The reset pin 10 for the element U2 is connected through a network which provides a reset signal to the element U2 followed by a trigger signal, after a preselected delay, to the trigger input terminal 11 of the element U2. For this purpose the operational amplifier 21 has its positive input terminal (pin 3 of element U1) connected to the battery side of the resistor R16, along with the positive input terminal to the operational amplifier 20 (pin 5 of element U1). The negative terminal for the operational amplifier 21 (pin 2 of element U1) is connected directly to a resistor 14 arranged in series therewith and having its opposite terminal connected to ground. The operational amplifier 21 has its output terminal (pin 1 of element U1) connected in a feedback path by means of a pair of series diodes C4 and C5 in turn connected to a light emitting diode DS1. The cathode electrode for the light emitting element DS1 is connected directly to the negative input terminal for the operational amplifier 21. The diode DS1 is selected to emit a red light. The diodes CR4, CR5 and DS1 are poled to form a feedback path from the output to the negative input terminal of amplifier 21. Similarly, a resistor R13 is coupled around the diode feedback loop by means of a parallel circuit path and to a capacitor C3 having its opposite terminal connected directly to reset input pin 10 of element U2. The reset signal is provided from the output terminal of the operational amplifier 21 to the reset terminal of the element U2 through the capacitor C3. A resistor R15 is coupled between the junction of the resistor R13 and the capacitor C3 and to the positive input terminal of the comparator 22 (the pin 12 for the element U1). The output terminal of operational amplifier 21 is connected to the positive input terminal of the comparator 22 by means of a diode CR6 poled to block the current path therebetween. The cathode electrode of the diode CR6 is connected to the output terminal for the operational amplifier 21 with its other electrode connected to the input terminal for the comparator 22. A capacitor C2 has its positive terminal connected to the positive input terminal of comparator 22 in common with the diode CR6 and the resistor R15, with its remaining electrode being connected directly to ground. The negative input terminal for the comparator 22 (pin 13 of element U1) is connected to the bias source BS. The output terminal of comparator 22 (pin 14 of element U1) is connected directly to the triggering pin 11 for the element U2 to provide the trigger signal thereto.

The green light signal for the charger BC is provided by a light emitting diode DS3. The light emitting diode DS3 is connected through a resistor R5 to the $V_{cc}$ source. The cathode electrode for the signaling element DS3 is connected to the output (pin 8 of element U1) pin for the comparator 23. The negative input to the comparator 23 (the 9 pin of element U1) is connected in series circuit relationship with a resistor R10.

The voltage regulator VR comprises a transistor Q3 which has its collector electrode directly connected to the contact P1-2 of the electronic circuit EC and its emitter electrode connected to the voltage source $V_{cc}$. The base electrode for the transistor Q3 is connected to the collector electrode through the resistor R7. The base electrode is also connected to the Zener diode CR1 having its anode electrode connected to ground through the resistor R6. The Zener diode CR1 is selected to be a 12-volt Zener. A further transistor Q4 is provided for controlling the illumination of the yellow signaling light emitter DS2. The emitter electrode for the transistor Q4 is connected directly to ground. The base electrode for the transistor Q4 is connected to the common junction between the anode electrode of the Zener diode CR1 and the resistor R6. The collector electrode of transistor Q4 is connected with the light emitting diode DS2 at its cathode electrode. The anode electrode of element DS2 is connected to the junction between the resistors R8 and R9. The remaining terminal of the resistor R8 is connected to the Zener diode CR2 at its anode electrode with its opposite electrode connected to the contact P1-2 of the electronic circuit EC. The Zener diode CR2 is an 18-volt diode.

The remaining circuit element is a bias source BS which is connected to the positive lead wire to the source $V_{cc}$. The bias source BS comprises the series resistors R3 and R4 with the common junction between the resistors R3 and R4 functioning as the bias voltage terminal providing approximately 1.5 volts. The remaining terminal of the resistor R4 is connected directly to ground.

Figure 4:
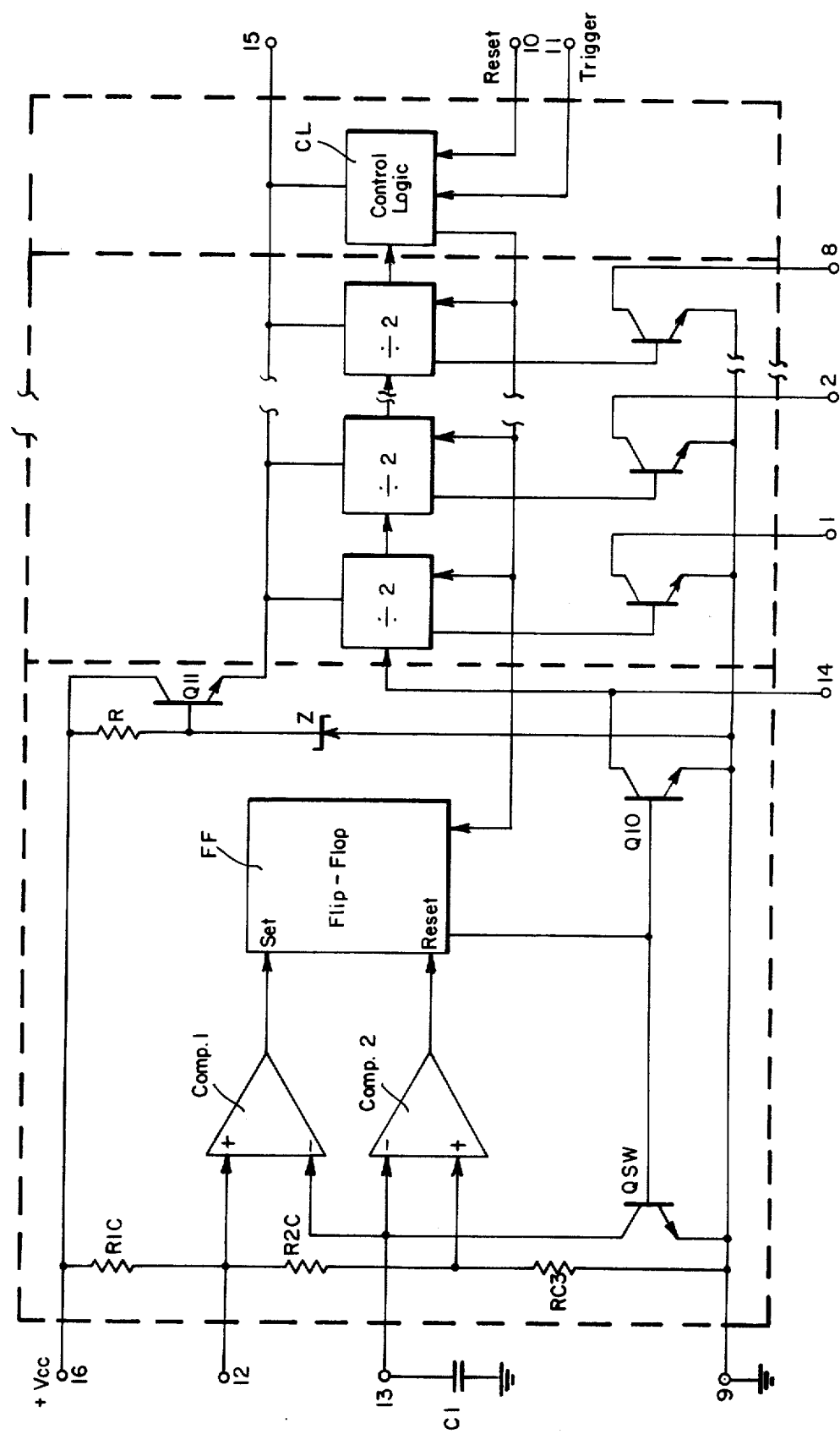
FIG. 4 is a block diagram of the programmable timer/counter employed in the circuit of FIG. 3.

An important consideration of the present invention is the implementation of the element U2 for controlling the charging and discharging of the capacitor C1. The commercially available element U2 is provided with a voltage dividing network at its input circuit comprising the resistors R1C, R2C and R3C; see FIG. 4. One terminal of the resistor R1C, as illustrated in FIG. 4, is connected to the plus $V_{cc}$ terminal or the number 16 pin for the element U2. The opposite terminal of the resistor R1C is connected in common with the pin 12 and the one terminal for the resistor R2C. The opposite terminal of the resistor R2C is connected to the positive terminal of the resistor R3C which has its remaining terminal connected to ground (at pin 9). The input circuit for the element U2 includes two comparators, identified as COMP1 and COMP2. The positive input terminal of COMP1 is connected to the junction between resistors R1C and R2C with pin 12. This junction is defined as the high reference voltage for charging the capacitor C1. The negative terminal for COMP1 is connected in common with the negative terminal of COMP2 and with pin 13 of element U2, which is the positive terminal of the capacitor C1. The output signal from COMP1 is connected to the "set" input terminal for the flip-flop FF. The positive input terminal for COMP2 is connected to the junction between resistor R2C and R3C. The output signal from the COMP2 is applied as the "reset" signal for the flip-flop FF. A switching transistor $Q_{SW}$ is connected with its collector electrode connected directly to pin 13 of U2 and its emitter electrode connected to ground. The base electrode of transistor $Q_{SW}$ is connected to a further transistor Q10. The base electrodes of the transistors $Q_{SW}$ and Q10 are connected in common and have a lead wire connected to the output terminal for the flip-flop FF. The emitter electrode of the transistor Q10 is connected to ground potential with the collector electrode connnected as an input to the first stage of the binary counter of the element U2. The collector electrode of transistor Q10 is also connected to the output pin 14 for the element U2. A further voltage regulating circuit comprising a resistor R and a Zener diode Z are connected between pin 16 in series circuit to ground potential, as illustrated. The anode electrode is connected to ground potential with the remaining terminal of the Zener diode Z connected to resistor R. At the junction between the Zener diode Z and the resistor R, a further switching transistor Q11 is provided. The transistor Q11 has its collector electrode connected to pin 16 and its emitter electrode connected to each of the binary counting stages for the binary counter for element U2. The binary counter is a conventional binary ripple counter so that with each input pulse it counts up the binary counting stages in sequence for counting up the counter. The control logic block CL has its reset input connected to the pin 10 of the element U2 and its triggering input to the terminal 11. The pin 15 is connected also the the control logic block CL. In the aforementioned discussion of the voltage dividing network comprising the resistance R1C, R2C and R3C, the high reference voltage to which the capacitor is charged is represented by the voltage at the junction between resistors R1C and R2C. The low reference voltage is considered to be the voltage level at the junction between the resistors R2C and R3C. The arrangement of the circuit is such that when the capacitor C1 is charged to the high reference voltage, it is automatically discharged by discharging through the switch transistor $Q_{SW}$ until the low reference voltage is reached. When the low reference voltage is reached, the capacitor C1 discharge is terminated and the capacitor is charged up again.

With the above structure in mind, the operation of the battery charger BC will now be examined in detail. Assuming that when the cable C is connected to the outlet O so that a connection is made between the terminals P1-1 and P1-2 to power the electronic circuit EC so that the voltage of the battery pack is sensed as having sufficient energy to charge the battery B, the operation will be described. This status of the power pack BCP is signaled by the illumination of the element DS2 providing a yellow light. With this signal of the status of the battery pack BCP, the cable C can then be connected into the cigarette lighter receptacle to connect the battery pack BCP across the battery B for the charging thereof. When this connection is made, a current will flow from the contact P1-1 through the battery B into P1-3. This current then will travel through the resistor R16 to the negative terminal of the battery pack BCP or to ground. The voltage drop across the reistor R16 is proportional to the current flowing in the loop between the battery pack BCP and the battery B. This current is converted into a current that is proportional to the current flowing in the battery loop and the resistors R16 and R11 are proportioned so that the current flowing into the collector of the transistor Q5 is 1/62,000 of the actual current flowing through the battery B. The current mirror then formed with the collector of the transistor Q5 will reflect this proportional battery current into the capacitor C1 for charging up the capacitor. The capacitor C1 is connected to pin 13 of the element U2 so that the time between the counts of the binary counter of the element U2, along with the voltage difference between the high and low voltage references and the value of the current into the capacitor C1, controls the total time for counting up of the binary counter. The total count capacity of the binary counter for the element U2 is 256. In order to program the time required for charging the battery B to a preselected charge, the count capacity of the binary counter is programmed to utilize the full count of the binary counter to signal the completion of the charging cycle. The desired charge transfer to the battery B is selected to be on the order of ½ ampere-hours. On the initial use of the battery charger BC, the time required for charging the battery B is about 13 minutes. When the battery pack BCP is initially placed across the terminals of the battery B, the initial charge current flowing into the battery of a discharged 12-volt lead-acid battery, for example, is approximately 4 amperes. In a few minutes this current drops to about 2.5 amperes. When the battery pack BCP terminal voltage degenerates, the current output decreases and the amount of time required for producing the ½ ampere-hour charge is increased. The present invention is proportioned so that the twelfth time the battery pack BCP is utilized, the output current of the batteries is about 1 ampere so that a charge time of ½ hour is required to achieve the desired ½ ampere-hour charge transfer.

When the current first flows through the battery B, the current will also flow through the resistor R16. The output signal of the operational amplifier 21 will cause a proportional current to flow through the feedback path around the operational amplifier 21 through the light emitting diode DS1 for illuminating the red signal R. It will also cause a signal to be coupled to the reset pin 10 for the element U2 and after a delay, a trigger signal will be presented to terminal 11 through the output terminal 14 for the comparator 22. The output of the comparator 22 will remain at a high voltage level during a charge cycle of the battery B. This will tend to cause the pin 8 of element U1 to go to a low voltage level, but since its pin 9 is shorted to ground whenever the counter of the element U2 is at a count other than 255, this is prevented. The output bits from the binary counter are provided at pins 1 though 8 of element U2 and are in the form of open collector transistors that are turned on when the corresponding bit is reset; see FIG. 3. When all the bits are reset or when the count reaches 255, pin 9 of the element U1 is released and pin 8 will then assume a low voltage level, turning on the signaling element DS3, a green light emitting diode, and terminating the timing cycle. The charging up of the capacitor C3 is terminated since the charging current is conducted through the diode CR3 into the comparator 23.

Specifically considering the charging and discharging of the capacitor C1 during the timing of the charging process of the battery B, it will be recognized, as noted hereinabove, that the current converter CC provides a current into the capacitor C1 for charging the capacitor. In accordance with the present invention, the current is proportioned to be 1/62,000 of the actual current flowing through the battery B. The capacitor C1 charges in response to the application of this current thereto. The comparator 1 senses when its two input voltages, applied to its positive and negative terminals, are equal, to provide an output signal to the "set" input terminal for the flip-flop. The negative input terminal of COMP1 senses the voltage on capacitor C1 during the charging time. When the voltage stored on the capacitor C1 reaches the high voltage reference, at pin 12, the output signal is produced at COMP1. This output signal switches the flip-flop FF to the "set" state and counts up the binary counter one count through the transistor Q10. At this time, a voltage is applied to the switching transistor $Q_{SW}$ for providing a discharge path from the positive terminal of the capacitor C1 through pin 13, the collector electrode, and emitter electrode of the switching transistor $Q_{SW}$ to ground for discharging the capacitor C1. The capacitor C1 discharges through this path until COMP2 senses the voltage on the capacitor C1 has discharged to a voltage that is equal to the low reference voltage coupled to the positive input terminal of the COMP2. When this occurs, COMP2 provides a "reset" signal tot he flip-flop FF which is effective for removing the voltage from the transistor $Q_{SW}$ and thereby terminating the discharge of the capacitor C1. The capacitor C1 will now once again begin to charge up to the high reference voltage level, and once this voltage level is again sensed by the comparator 1, the flip-flop FF will be "set" and another count entered into the binary counter. The capacitor C1 will be discharged, once again, until the low reference voltage is sensed. The continually occurs during the charging of the battery B. This continually occurs during the charging of the battery B. When the binary counter is counted up to the count 255, all of the pins 1 through 8 will signal a binary or high voltage level, and since these pins are connected in common, the voltage signal is applied to the negative input of comparator 23. The voltage provided by the binary counter of the element U2 and the voltage across the resistor R10 at this point will overcome the bias voltage BS applied t the positive terminal of the comparator 23 to cause the comparator 23 output to assume a low voltage level. The low output voltage at comparator 23 causes the charging current previously flowing to the capacitor C1 to flow through the diode CR3 into the comparator 23. This current flows into the comparator 23, along with the current flowing through resistor R5 and the green light emitting diode DS3. This will then cause the green light to be illuminated and signal the user that the battery B is charged, consistent with the counter reaching its maximum count.

Now referring to the voltage regulator VR portion of the electronic circuit EC, this regulating action will be examined. The voltage regulator is comprised of the Zener diode CR1, which is a 12-volt Zener diode, along with the transistor Q3 and the resistor R7. When the battery B is not coupled to the battery pack BCP, the voltage at the pin P1-2 could be as high as 25 volts, thereby exceeding the voltage rating of the element U2. The voltage regulator VR is provided to sense this voltage level and protect the element U2. The Zener diode CR2 is an 18-volt Zener. Without the battery B being across the battery pack BCP, the voltage at pin P1-2 is the open circuit voltage of the battery pack BCP. If this battery pack voltage is less than about 18 volts and greater than 12 volts, the yellow light emitting didoe DS2 will not be energized and thereby will not be illuminated. In this state the element DS2 will be energized by the flow through the resistor R8. At this time the voltage level at the output of the comparator 22 is at a low voltage level and the current flows through CR2 and R8. After the battery B is connected to the battery charger BC, the signaling element DS2 can obtain current through the resistor R9 only if the transistor Q4 is in a conductive state. This latter condition can occur only if the voltage at the pin P1-2, which now represents the output voltage of the discharged battery B, is more than about 12 ½ volts to break down the Zener diode CR1. If the battery B contains a dead cell, it will not reach this voltage. In summary, then, it can be considered that if the battery B is not connected to the battery charger BC and the voltage from the battery pack BCP is greater than approximately 19 volts, the transistor Q4 will be rendered conductive. The output voltage at the comparator 22 will be at a low voltage level and will provide a current path through the yellow light emitting diode DS2 through the Zener diode CR2, resistor R8 and transistor Q4. Similarly, while the battery B is still not in a circuit relationship with the battery charger BC and assuming that the voltage from the battery pack BCP is greater than 12 volts and less than 18 volts, under these conditions the transistor Q4 will be conductive and the output voltage at the comparator 22 will also be low. Accordingly, the yellow light emitting didoe DS2 will not have a current path and so it will not be energized. This latter condition will then signal that the charge remaining in the battery pack BCP is insufficient to charge the battery B and the user should be aware.

Now assuming that the battery B is connected between the terminals P1-1 and P1-3, the analysis of the voltage regulator VR action will be considered. If the input voltage for the battery B is greater than 12 volts and less than 18 volts, the transistor Q4 will be rendered conductive through the Zener diode CR1 and resistor R7 and the output from the comparator 22 will be at a high voltage level. This will cause current to flow through the element DS2 by means of the current path through the resistor R9 and the transistor Q4. This will indicate that the battery is being charged. If the input voltage from the battery B is less than 12, the transistor Q4 will be rendered non-conductive and despite the fact that the voltage level at the output of the comparator 22 is at a high voltage level, there will be no current path through the yellow light emitting diode DS2, thereby indicating that the battery B voltage is too low.

I claim:

1. Portable apparatus for charging a lead-acid battery comprising means for providing a preselected direct current voltage and current for charging a discharged lead-acid battery, said means including a plurality of dry cell batteries connected in a series circuit relationship, means for connecting said lead-acid battery to be charged in a series circuit relationship with said direct current means for transferring a pre-selected quantity of charge to the lead-acid battery, electronic circuit means coupled across said direct current means in a parallel circuit relationship with the lead-acid battery, the electronic circuit means including means for providing an electrical current signal representative of the actual current transferred to a battery being charged, means for converging said electrical current signal to a voltage control signal, voltage controlled oscillator means coupled to be responsive to the voltage control signal for controlling the oscillation cycles thereof, and electronic counting means for accumulating the oscillator cycles therein until a preselected count is reached, the preselected count being representative of the transfer of a preselected quantity of electric charge to the lead-acid battery.

2. Portable apparatus for charging a lead-acid battery as defined in claim 1 including voltage regulating means coupled across the direct current means for regulating the direct current voltage coupled to the electronic circuit means.

3. Portable apparatus for charging a lead-acid battery as defined in claim 1 wherein said plurality of dry cell batteries comprises 16 alkaline batteries arranged in a series circuit relationship.

4. Portable apparatus for charging a lead-acid battery as defined in claim 1 wherein said electronic counting means is a binary counter coupled to be counted up each time the oscillator means reaches a preselected point in each cycle of oscillation.

5. A method of charging a lead-acid battery from a battery pack including the steps of determining the number of alkaline batteries to be used for producing sufficient voltage and current to charge a chargeable, discharged lead-acid battery for transferring a preselected quantitity of electricity to a discharged battery when the individual alkaline batteries are connected in a series circuit relationship and thereby defining the power pack, applying the thus defined battery pack to a discharged battery by supplying current from the power pack in the opposite direction from he flow of current from the battery on discharge for charging the battery, continuously providing a signal representative of the charging current flowing through the battery on charging and measuring the charge transferred to the charging battery with time based on said signal, and when the measured charge transferred reaches a preselected level, automatically signaling the termination of the charging interval.

6. A method for charging a battery including the steps of providing a direct current power source comprising a plurality of batteries for providing a preselected direct current voltage and current, coupling a discharged battery to be charged to the direct current power source charging said battery to a preselected level of charge transfer, applying a current having a preselected ratio relative to the battery charging current to a capacitor to charge the capacitor to a preselected high voltage level, sensing the time that the capacitor charges to the preselected high voltage level and counting a counter up one count each time the capacitor is charged to a preselected high voltage level and then causing the capacitor to be discharged to the preselected low voltage level, sensing the time that the capacitor charges to said low voltage level and terminating the discharge of the capacitor and thereby initiating the recharging of the capacitor to said preselected high voltage level, when the counter reaches a predetermined count representative of a preselected charge transferred to the battery, automatically terminating the charging of the capacitor and signaling that the battery is charged.

7. A method for charging a battery including the steps of providing a battery pack having a preselected output voltage and current capable of providing a charging current to the discharged battery, coupling the battery pack to an electronic circuit for measuring the transfer of electrical charge to a battery to be charged and signaling the charging status of the battery pack and the battery to be charged, the electronic circuit having a first indicator for signaling that sufficient energy is present in the battery pack to enable a battery to be charged therefrom when the electronic circuit is coupled to the battery pack so as to be powered therefrom, the electronic circuit having a second indicator for signaling that an electrical charge has been transferred to a battery undergoing charging and a third indicator for signaling when a preselected measure of electrical charge has been transferred to a battery undergoing charging for signaling the charged state of the battery, coupling a battery to be charged to the battery pack for providing a charging current to the battery and charging the battery, sensing the charging current coupled to the battery being charged at the electronic circuit for measuring the transfer of electrical charge to said battery and controlling the signaling state of the second and third indicators during the charging of the battery, and continuously charging the battery until the electronic circuit measures that the preselected measure of electrical charge has been transferred to the battery and signals the charged state by said third indicator.

8. A method of charging a lead-acid battery from a direct power power source consisting of dry cell batteries including the steps of arranging sixteen alkaline batteries in a series circuit relationship as a power pack for providing an output voltage of twenty-four volts, directly connecting a discharged lead-acid battery, capable of being charged, to the power pack for continuously transferring an electric current to the battery for recharging the battery over a preselected time interval, the preselected time interval being selected for transferring a preselected quantity of electricity to the battery, and automatically measuring the actual current transferred to the battery over said preselected time interval and automatically signaling when said preselected quantity of electricity has been transferred to the battery.

9. A method of charging a lead-acid battery from a direct current power source consisting of dry cell batteries as defined in claim 8 wherein the quantity of electricity transferred is ½ ampere-hour.

10. A method of charging a lead-acid battery from a direct current power source consisting of dry cell batteries as defined in claim 8 or 9 wherein the step of automatically measuring the current transfer includes the steps of sensing the charging current flowing through the battery and converting the sensed current to a voltage for controlling an oscillator and accumulating the number of oscillator cycles in an electronic counter during the preselected time interval until the preselected quantity of electricity has been transferred.

11. A method of charging a lead-acid battery from a direct current power source consisting of dry cell batteries as defined in claim 8 including the step of automatically signaling that said power pack has a sufficient quantity of charge for re-charging the battery.

12. A method of charging a lead-acid battery from a direct current power source consisting of dry cell batteries as defined in claim 11 including the step of automatically signaling the battery is being charged after it has been connected to the power pack.

13. A method of charging a lead-acid battery from a direct current power source consisting of dry cell batteries as defined in claim 12 including the step of automatically signaling a preselected voltage level at the battery during the charging thereof.

14. Portable apparatus for charging a discharged lead-acid battery comprising means for receiving a self-contained power source having a preselected voltage and current selected for charging said lead-acid battery, means for connecting said battery to be charged to receive a battery charging current from said charging power source when connected in charging circuit relationship therewith, circuit means coupled between said two mentioned means in a parallel circuit relationship with each of said means and powered from a connected self-contained power source for transferring a preselected quantity of electrical charging current between said power source and a connected battery to be charged, said circuit means including circuit means for providing an electrical current signal representative of a preselected small fraction of the battery charging current, voltage controlled, time-base oscillating signal means having a capacitor adapted to be charged and discharged for defining the oscillations thereof, means for coupling the electrical signal representative of a fraction of battery charging current to said oscillator capacitor for charging the capacitor therefrom at a charging rate in accordance with the magnitude of the battery charging current, means for sensing the voltage stored on the capacitor to determine when the voltage on the capacitor is charged to a preselected high voltage level and for terminating the charging of the capacitor when the high voltage level is reached and then causing the discharge of the capacitor, said means for sensing further sensing the voltage stored on the capacitor to determine when the voltage on the capacitor is discharged to a preselected low voltage level other than zero, and for terminating the discharge of the capacitor when the low voltage level is reached and then causing the recharging thereof, electronic, binary counting means coupled to be responsive to the capacitor being charged to said high voltage level for counting up the counter one binary bit each time the capacitor is charged to said high voltage upon the actuation of the counting means, the capacity of the counter being selected to correspond to the transfer of a preselected charge to said battery being charged so that when the preselected count of the counter is fully counted up, the battery is charged with said preselected charge, means for sensing the initiation of the battery charging to activate the binary counting means and thereby commence the battery charging timing cycle, and circuit means coupled to be responsive to the counter signalling the preselected count for terminating the charging of the capacitor.

15. Portable apparatus for charging a discharged lead-acid battery as defined in claim 14 including means for connecting and disconnecting the circuit means to said first mentioned means for powering the circuit means therefrom when said power source is connected to said first mentioned means, said circuit means including means for signalling that said connected power source has sufficient energy for charging said battery when the power source is connected and the discharged battery is disconnected from said circuit means.

16. Portable apparatus for charging a discharged lead-acid battery as defined in claim 6 wherein said signalling means is a preselected light emitting device that is connected to be energized only when said power source voltage has a preselected voltage level.

17. Portable apparatus for charging a discharged lead-acid battery as defined in claim 14 or 15 including means for signalling that a preselected charge has been transferred to a battery undergoing charging.

18. Portable apparatus for charging a discharged lead-acid battery as defined in claim 15 wherein means for signalling the energy of the power source automatically signals that thevoltage of said battery undergoing charging has a preselected voltage level when the discharged battery is connected to the power source.

19. Portable apparatus for charging a discharged lead-acid battery as defined in claim 15 wherein each of the signalling means comprises light emitting diodes emitting light rays of different colors.

20. Portable apparatus for charging a discharged lead-acid battery as defined in claim 19 wherein the signalling means comprises three light emitting diodes.

* * * * *

UNITED STATES PATENT AND TRADEMARK OFFICE
CERTIFICATE OF CORRECTION

PATENT NO. : 4,692,680
DATED : September 8, 1987
INVENTOR(S) : Paul Sherer

It is certified that error appears in the above-identified patent and that said Letters Patent is hereby corrected as shown below:

Column 8, line 51, after "$O_2$," and before "$O_8$,", insert -- $O_4$, --.

Column 11, line 41, change "the" (first occurrence) to -- to --.

Column 13, line 33, delete "tot" and insert -- to the --;

Column 13, lines 41 and 42, delete "The continually occurs during the charging of the battery B."

Column 13, line 51, change "t" to -- to --.

Column 15, line 7, change "converging" to -- converting --.

Column 15, line 40, change "he" to -- the --.

Column 16, line 35, change "power" (first occurrence) to -- current --.

Column 18, line 37, change "thevoltage" to -- the voltage --.

Signed and Sealed this

Twenty-eighth Day of June, 1988

Attest:

DONALD J. QUIGG

Attesting Officer

Commissioner of Patents and Trademarks